Dec. 5, 1967 — W. W. PUCKETTE — 3,356,160
CULTIVATOR
Filed Aug. 20, 1965 — 2 Sheets-Sheet 1
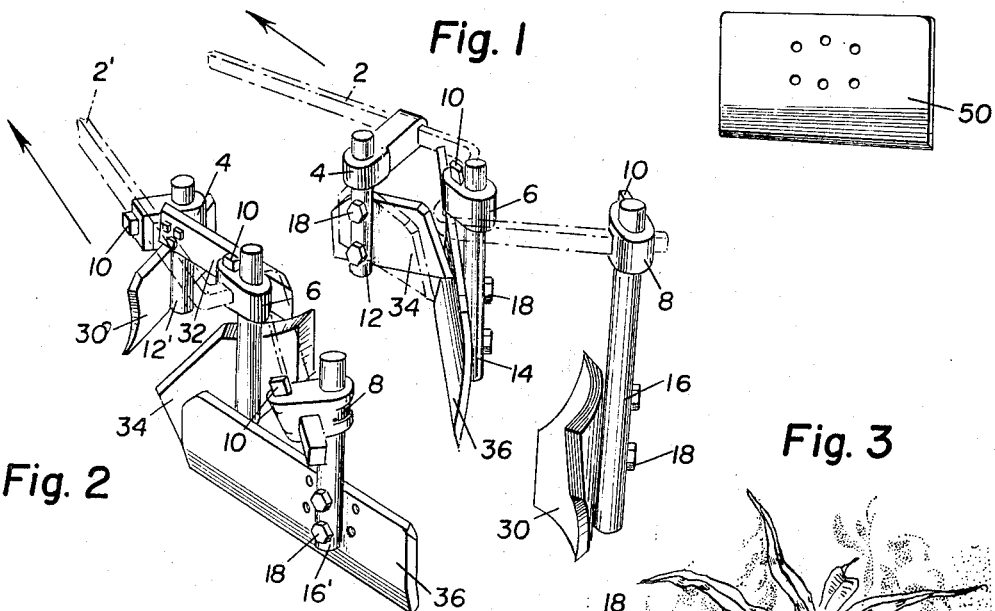
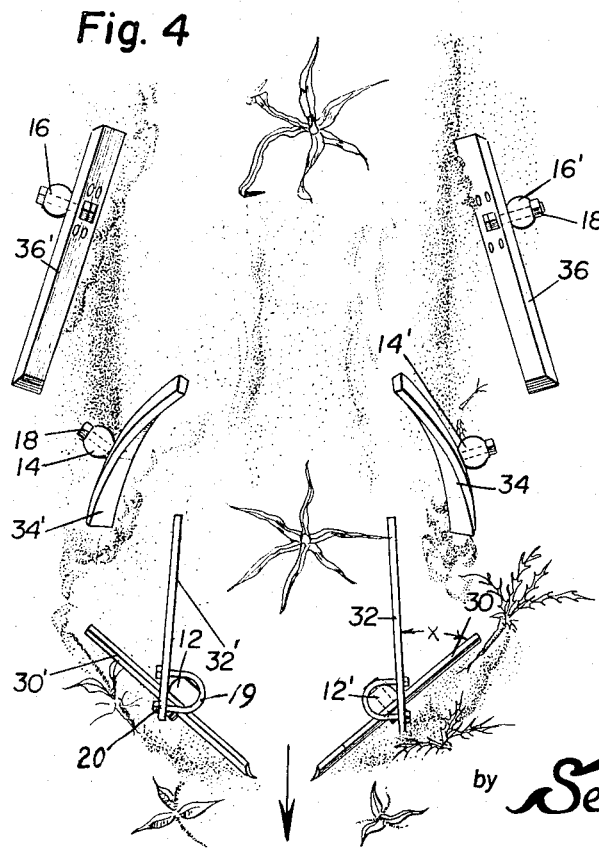
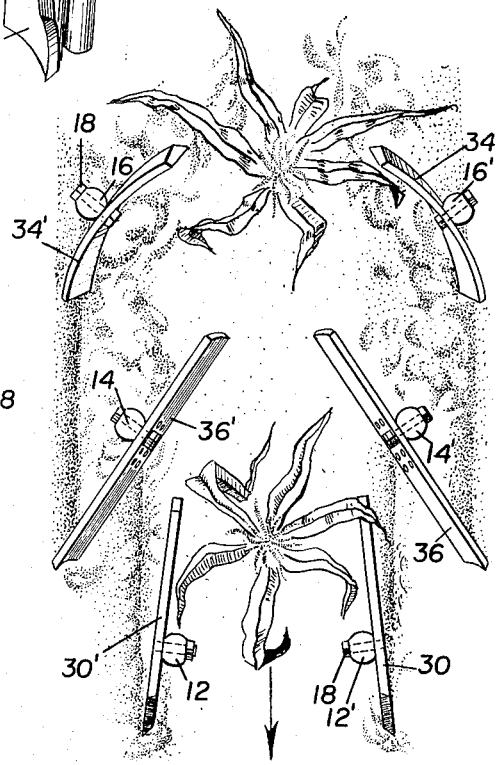
INVENTOR,
Walter W. Puckette
by Semmes & Semmes
ATTORNEYS INVENTOR,
Walter W. Puckette
by Semmes & Semmes
ATTORNEYS

United States Patent Office 3,356,160
Patented Dec. 5, 1967

3,356,160
CULTIVATOR
Walter W. Puckette, Robin Branch Farm,
Gladys, Va. 24554
Filed Aug. 20, 1965, Ser. No. 481,380
4 Claims. (Cl. 172—145)

ABSTRACT OF THE DISCLOSURE

A ground engaging tobacco cultivator, particularly only a multi-gang which "scrapes the crust" and weeds, plows and selectively pushes topsoil back onto the plant and banks the furrow on the crop row.

---

The present invention is concerned with a cultivator that may be used for all crops planted in rows, for example, tobacco, corn, vegetables, and cotton. The cultivator is adaptable for use throughout the cultivating season, and can be used also to bed the land.

My particular cultivator insures fast effective cultivation. With the many adjustments that can be made, any desired amount of loose pulverized soil may be delivered to the plant whether it is large or small. The amount of delivered soil is determined by the angle and depth of the blades, as well as by the adjustments that can be made in the blades used. This saves both time and labor when cultivating.

It is therefore an object of invention to provide a cultivator with interchangeable blades, so as to enable cultivating of the plant throughout the growing season.

It is another object of invention to deliver any desired amount of loose, pulverized soil to the plant, the amount being determined by the angle and depth of the blades.

It is another object of the invention to provide a cultivator with blades that may be reversed to give double life to the blades.

It is another object of invention to provide a cultivator which is adaptable for use on either a one, two or three row cultivator and which may be interchangeably used to bed the land.

These and other objects of my invention will be apparent from the following specification and drawings in which:

FIGURE 1 is a perspective view of the right side of the cultivator going in the forward direction, as used for large plants;

FIGURE 2 is a perspective view of the left side of the cultivator, going in the forward direction, as used for small plants;

FIGURE 3 is a plan view of the cultivator as used for large plants;

FIGURE 4 is a plan view of the cultivator as used for small plants;

FIGURE 7 is a perspective view of a modified form of blade and shaft mounting means that may be utilized.

Figure 5:
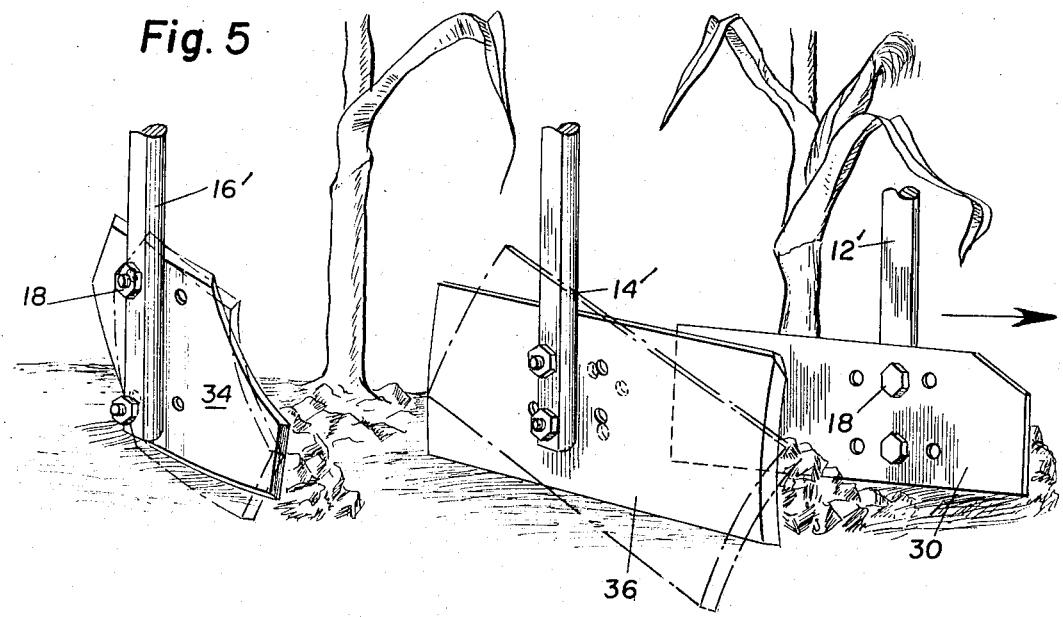
FIGURE 5 is a perspective view of the side of the cultivator as used for large plants.

As illustrated in FIGURE 1, tool bar extension clamps 4, 6 and 8 are mounted on cross bar supports 2 and 2'. The tool bar extension clamps 4, 6 and 8 lock shafts 12 and 12', 14 and 14' and 16 and 16' in position on supports 2 and 2' when pegs 10 are inserted. The blades are mounted on the shafts by conventional nuts and bolts, as shown by elements 18.

Figure 6:
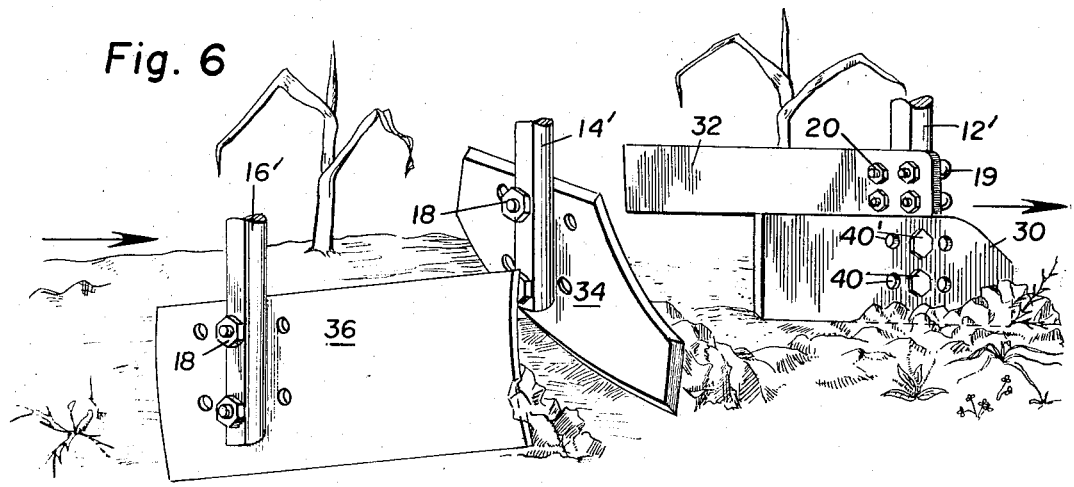
FIGURE 6 is a perspective view of the side of the cultivator as used for small plants.

FIGURES 2, 4 and 6 show that four sets of blades are utilized when the cultivator is used to cultivate small plants. These include blades 30, 34 and 36 and baffles 32. Front blade 30 is set at an angle to the soil so as to trim away from both sides of the plant, any crust that has formed after rain. It also removes grass and other clods, and delivers such material to the middle of the row where it is pulverized by the tractor wheels, and by the trailing plow feet which plow up the tractor track.

As indicated in FIGURE 4, blades 30 and 30' form a dihedral angle, the apex of which is in the direction of movement of the tractor and hence the cultivator being pulled by the tractor. These blades are designed to remove the crust and push it away from the plant to the center of the depression between rows of plants. Baffle or shield 32 and 32' are attached respectively to supports 12' and 12, and regulate the amount of earth which is delivered to the mound. That is, the angular displacement X from blade 30 is variable because of the variable clamping means 19 and 20. Thus, as the angle X is increased, more earth will be able to flow to the mound, and thus to the plant.

The crust having been removed and pushed away from the plants by blades 30 and 30', blades 34 and 34' are then used to take the sub soil, which is fine and porous, and push it towards the plant. This is done by virtue of the fact that blades 34 and 34' are set to form a dihedral angle, with the apex pointing towards the rear of the tractor. When cultivating small plants, the second set of plow blades 34 and 34' are mounted on shaft 14' and 14, respectively. Blades 34 and 34' are specially designed and curved to deliver the soil back to the plant without force. Conventional cultivator blades bring the soil back to the plant when cultivating at a fast speed, with too much force, thus knocking them over and covering them. With my particular blade 34, however, and with the baffle 32 determining and delivering the desired amount of soil, the force is weaker, thus making this type of cultivator more effective at a faster rate of speed. The advantage, of course, is efficiency and time saving, since the cultivator can operate at a faster rate of speed, without damaging the plant.

The third set of blades used when cultivating small plants are rectangular blades 36 and 36', which are mounted on shafts 16' and 16, respectively, and which are longer than blades 34 and 30, enable the blades to reach out and get more of the soil and deliver it back to the row. With this cultivator blade, both sides of the row are pulverized in such a manner that all undesired weeds and grass are broken up so that their roots are exposed and killed.

As the plant grows, it will require a greater amount of soil to nourish it. Blades 34 and 36, and 34' and 36', respectively, will then be interchanged as indicated in FIGURES 1, 3 and 5. Positioning blades 36 and 36' on supports 14' and 14 respectively, will bring up more soil to cover the grass on top of the plant row, and will disperse the desired amount of soil around the plant. When cultivating large plants, baffles or shields 32 and 32' can be removed because the plant will be able to withstand more force, and the crust need not be broken up as much as in the case of small plants. The front blades 30 are then raised and rotated as illustrated in FIGURE 3, so that they no longer form a dihedral angle, and will govern and break the force of the soil being returned to the plant.

As illustrated in FIGURES 4 and 6, the blades 30 and 30' may be disposed at different angles, with points up or down, to thereby govern the flow of crust away from the forward blades, and the flow of finely divided soil toward the plant by the rearward blades. The degree of penetration of blades 30 into the ground is determined by the angle and depth of penetration. These are made variable by the fact that blades 30 and 30' may be mounted on shafts 12' and 12, respectively, through different sets of holes 40' and 40. Depending upon the particular combination of holes 40′ and 40 utilized, and the positioning of shafts 12 and 12′ on the cross bar supports 2 and 2′, as well as by rotating the shafts in the tool bar extension clamps, the depth and angle of penetration will vary.

FIGURES 5 and 6 also show that different sets of holes are provided for blades 36 and 36′, to vary the amount of top soil which is delivered to the plants. This same type of adjustment may also be used to vary the angle and depth of blades 34 and 34′ and blades 32 and 32′ as illustrated in the drawings.

Alternatively, FIGURE 7 shows another arrangement wherein the angular position of the blades may be varied by utilizing different holes 49 together with hole 48 to mount the blades on the shafts. In this case, holes 49 are at equal radial distances from hole 48. The blade 50 illustrated in FIGURE 7 may be used in place of blades 36 and 36′. It is substantially shorter, and will therefore deliver less soil to the plant if this is desired. The angular displacement X of baffle 32 relative to blade 30 is also variable because of nut and bolt combination 19 and 20. As illustrated in FIGURES 4 and 6, baffle 32 is mounted on shaft 12′ via U bolts 19 and nuts 20. Loosening of nuts 20 will enable rotation of baffle 32 around the shaft 12 to thereby vary the angle X. Furthermore, the position of baffle 32 with respect to blade 30 in the vertical plane may be varied by simply moving baffle 32 along shaft 12′. Normally, baffle 23 is placed directly above the top side of blade 30.

FIGURES 3 and 4, show that the corresponding blades of each set of blades are identical and may therefore be interchanged and reversed so as to give double life to the blades. Furthermore, all of the blades can be used on any of the shafts, since the holes for mounting the blades on the shafts are equally spaced. Thus, my invention also provides for faster and more effective cultivation by governing the flow of soil by the many adjustments possible, while simultaneously destroying grass and weeds. The interchangeability of the blades to fit the different needs of the plant as it grows provides a compatible cultivator unit capable of use throughout the growing season.

Having described my invention I claim the following:

1. A cultivator for attachment to a tractor for crops planted in rows, which comprises:
   (A) two support bars mounted in symmetrical relationship with respect to a longitudinal axis;
   (B) three sets of shafts mounted on said support bars, said three sets comprising two shafts each, mounted opposite one another on said support bars;
   (C) ground engaging blades mounted on each of said shafts, said blades mounted on each set of shafts being identical and including:
      (i) a first set of blades being set at an angle to the soil to break the soil crust, and to deliver grass and weeds to the middle of the row whereby it may be pulverized by the tractor wheels and by the trailing plow feet;
      (ii) a second set of blades being curved so as to deliver the soil back to the plant without force when cultivating at a fast speed;
      (iii) a third set of blades being longer than said first two sets of blades, and being substantially rectangular in shape, to enable the blades to deliver soil back to the row; and
   (D) a vertically and laterally adjustable baffle connected to each shaft in said first set directly above said first set of blades, so as to regulate the amount of earth which flows to the mound between said first and second set of blades, said baffle being laterally and vertically adjustable.

2. The cultivator as described in claim 1 wherein said second and third sets of blades are interchangeable to enable the blades to feed more soil to said plants when they are interchanged, as required by the growing plant, and means to remove said variable baffle when said second and third sets of blades are interchanged.

3. The cultivator as described in claim 2 wherein said blades are reversible so as to double the effective life of each blade.

4. The cultivator as described in claim 3 wherein:
   (E) clamping means are provided to mount said shafts to said support bars, said shafts being rotatable in said clamping means to provide an adjustment of the angle which each set of blades makes with respect to said longitudinal axis;
   (F) and wherein each of said blades defines a series of holes to provide adjustment of the angle and depth of penetration of each of said blades into the ground, whereby the amount of crust broken, and amount of top soil delivered to the plant, is variable.

References Cited

UNITED STATES PATENTS

| | | | |
|---|---|---|---|
| 723,190 | 3/1903 | Wallis | 172—195 |
| 951,238 | 3/1910 | Elliott | 172—739 X |
| 962,392 | 6/1910 | Sheldon | 172—686 X |
| 975,975 | 11/1910 | Meloen | 172—686 X |
| 2,195,513 | 4/1940 | Evans | 172—367 |

FOREIGN PATENTS 642,125   4/1961   Canada.

ABRAHAM G. STONE, *Primary Examiner.*

J. R. OAKS, *Assistant Examiner.*